United States Patent [19]

Kim et al.

[11] Patent Number: 4,984,821
[45] Date of Patent: Jan. 15, 1991

[54] GAS EXPANSION TYPE SHOCK ABSORBING SAFETY CLOTH FOR AUTOCYCLE DRIVER

[75] Inventors: Sang N. Kim, Seoul, Rep. of Korea; Alfred Kroiss; Heinz Methfessel, both of Wartenberg, Fed. Rep. of Germany

[73] Assignee: Gasomatic - Airbag International Ltd., Seoul, Rep. of Korea

[21] Appl. No.: 349,583

[22] Filed: May 9, 1989

[30] Foreign Application Priority Data

May 9, 1988 [KR] Rep. of Korea ............. 88-5371

[51] Int. Cl.$^5$ ............................................. B60R 21/16
[52] U.S. Cl. .................................... 280/728; 280/730; 2/2; 2/DIG. 3
[58] Field of Search .......... 280/730, 728; 2/2, DIG. 3

[56] References Cited

U.S. PATENT DOCUMENTS

| | | | |
|---|---|---|---|
| 4,089,065 | 5/1978 | McGee | 2/DIG. 3 |
| 4,825,469 | 5/1989 | Kincheloe | 2/DIG. 3 |

FOREIGN PATENT DOCUMENTS

| | | | |
|---|---|---|---|
| 2499373 | 8/1982 | Fed. Rep. of Germany | 2/DIG. 3 |
| 8201464 | 5/1982 | PCT Int'l Appl. | 2/DIG. 3 |

*Primary Examiner*—Kenneth R. Rice
*Attorney, Agent, or Firm*—Morgan & Finnegan

[57] ABSTRACT

A gas expansion type shock absorbing safety cloth for autocycle drivers is disclosed which comprises; a shock absorbing tube; a gas regulator connected through gas conduits to the shock absorbing tube; one or more of compressed gas storage and discharge devices connected to the gas regulator; an ignition controller; a trigger device connected through an electric wire and a pull string to the said ignition controller; and a connector disposed an intermediate position of both the electric wire and the pull string in such a manner that it is separated upon applying of a pulling force exceeding a certain predetermined value. In contrast to the conventional device in which the quick opening connector is disposed at an intermediate position of a conduit connecting the shock absorbing tube and the compressed gas filler, the connector is disposed between the trigger device and the gas storage and discharge device, thereby making the whole system simpler and more effective, and making it possible to pack the various components of the system into a small bag for carrying with it conveniently.

15 Claims, 13 Drawing Sheets

F I G. 6(B)
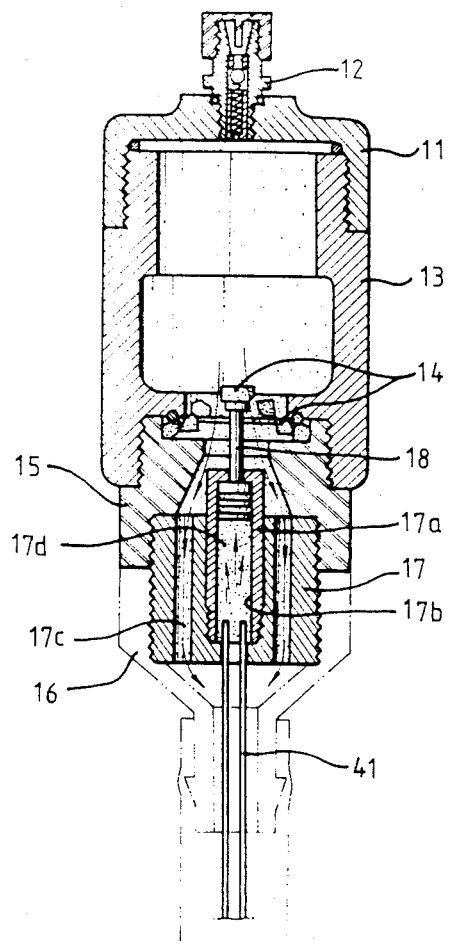

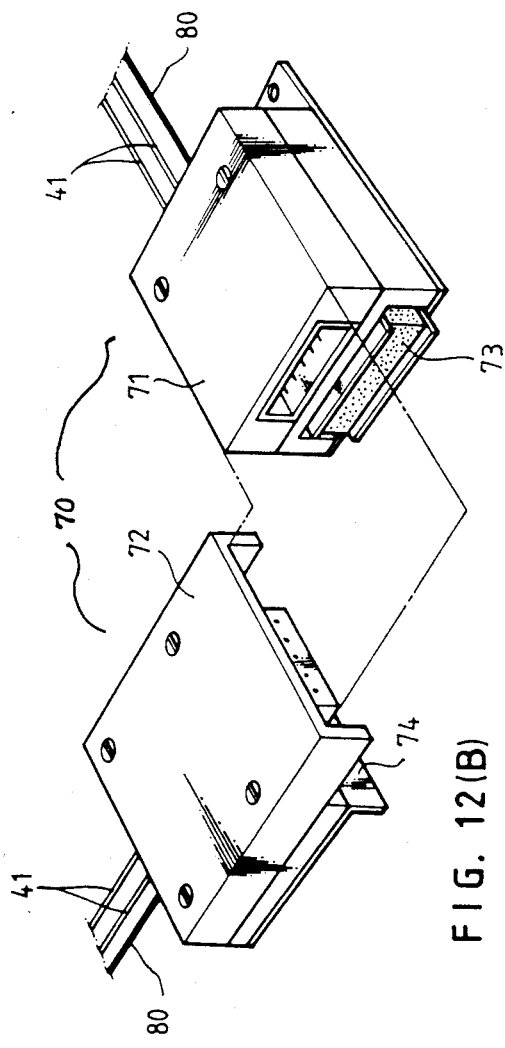
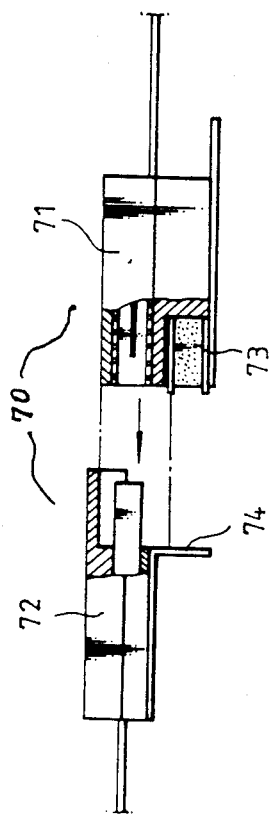
FIG. 12(A)
FIG. 12(B)

GAS EXPANSION TYPE SHOCK ABSORBING SAFETY CLOTH FOR AUTOCYCLE DRIVER

FIELD OF THE INVENTION

The present invention relates to an autocycle driver's safety cloth provided with a shock absorbing tube into which compressed gas is filled to automatically expand it.

BACKGROUND OF THE INVENTION

PCT Application No. DE81/00181 discloses a safety cloth for autocycle drivers. In this device, a quick opening connector is provided at an intermediate position of a conduit which connects the shock absorbing tube of the safety cloth to the safety system including a compressed gas filler or a compressed gas generator, so that, in an emergency such as an accident, the shock absorbing tube should be filled with compressed gas, and then, the said quick opening connector should be released, thereby making the shock absorbing tube separated from the safety system. However, the quick opening connector is very much complicated in its structure, and not only so, but a check valve has to be installed in the conduit or the connecting conduit helping the connection of the conduit to the shock absorbing tube so that the leakage of the compressed gas from the shock absorbing tube after the separation of the conduit from the quick opening connector is to be prevented. Further, the compressed gas generator has also to be provided with an igniting chemical mixture and a metal net for cooling the combustion gas, with the result that its structure is very complicated, and that, after a use, the replacement cost is very high.

SUMMARY OF THE INVENTION

The present invention is intended to overcome the disadvantages of the conventional device.

Therefore, it is an object of the present invention to provide a compressed gas expansion type shock absorbing safety cloth for autocycle drivers, in which the trigger device secured to the autocycle and the compressed gas storage and discharge devices connected to the safety cloth are detachably interconnected by means of a simple connector, and the said compressed gas storage and discharge device such as a compressed gas container and discharger, a gas regulator, and an ignition device are designed in an utmostly compact type in such a manner that they can be carried packed in a bag.

It is another object of the present invention to provide a compressed gas expansion type shock absorbing safety cloth for autocycle drivers, in which the structure of the compressed gas storage and discharge device is made very simple, and the replacements of the components in the case of reuses are very easy.

It is still another object of the present invention to provide a compressed gas expansion type shock absorbing safety cloth, in which a gas regulator for controlling the gas flow is provided so that the filling of the gas into the shock absorbing tube can be smoothly carried out.

It is still another object of the present invention to provide a compressed gas expansion type shock absorbing safety cloth, in which a plurality of compressed gas storage and discharge devices are successively actuated, and at the same time, the structure of the trigger device is simplified.

In achieving the above objects, the safety cloth according to the present invention comprises: a shock absorbing tube which is constituted such that, if the wearer of the safety cloth departs from the autocycle by a certain predetermined distance, then the stored compressed gas is immediately filled into the shock absorbing tube, and the said shock absorbing tube is instantly expanded; a gas regulator to which the said shock absorbing tube is connected directly through one or more of gas conduits; one or more of the compressed gas storage and discharge devices which are connected to said gas regulator, and which are for storing the compressed gas and momentarily discharging the compressed gas through an electrical ignition; an ignition controller electrically connected to said compressed gas storage and discharge devices; and a connector which is disposed between a trigger device secured to the autocycle and said ignition controller to electrically connect them. The connector is separable upon the application of a tensile force exceeding a certain predetermined level, so that the compressed gas should be discharged upon detection of a certain predetermined separation distance from the autocycle.

BRIEF DESCRIPTION OF THE DRAWINGS

The above objects and other advantages of the present invention will become more apparent by describing the preferred embodiments of the present invention with reference to the attached drawings in which;

FIG. 6B is a cross sectional view showing the compressed gas storage and discharge device, in which the compressed gas is being discharged toward the gas regulator upon fracture of the closure disc;

FIG. 12A is a perspective view of the connector in a separated state, and FIG. 12B is a partly cut-out and partially sectional side view of the connector in a separated state.

DESCRIPTION OF THE PREFERRED EMBODIMENTS

Figure 1:
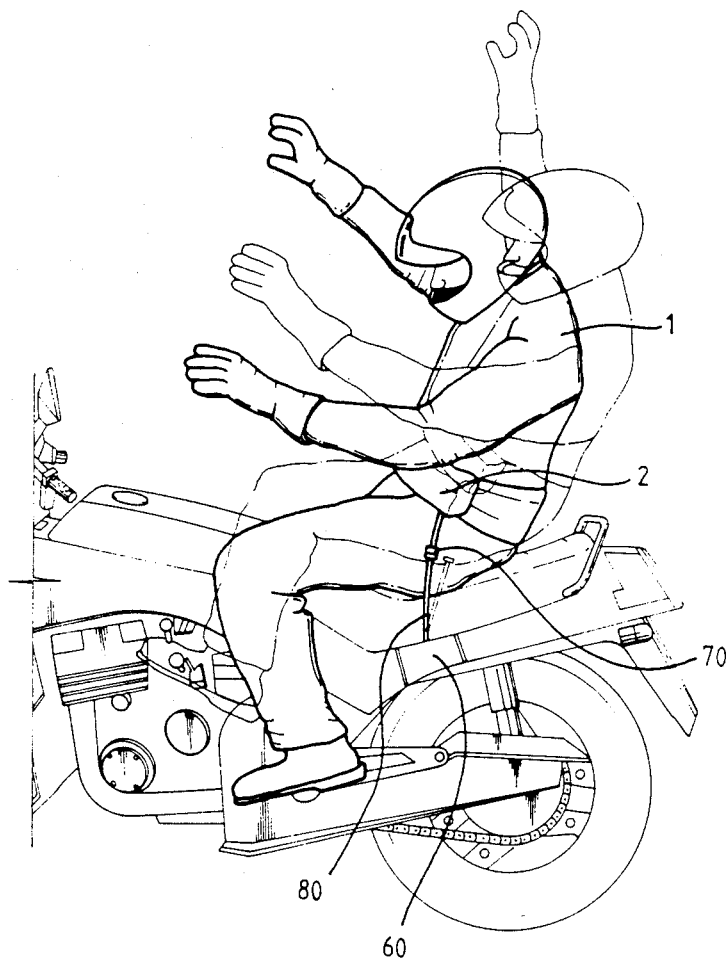
FIG. 1 illustrates the actuation state of the gas expansion type shock absorbing safety cloth at the instant when the autocycle with the driver wearing the said safety cloth collides with an object.

FIG. 1 illustrates the actuation state of the safety cloth 1 of the present invention at the instant when an autocycle with a driver wearing the said cloth 1 collides with an object. Here, various components for filling the compressed gas into an expansion tube can all be packed into a bag 2, and they are connected to a trigger device 60 through a pull string 80.

Figure 2A:
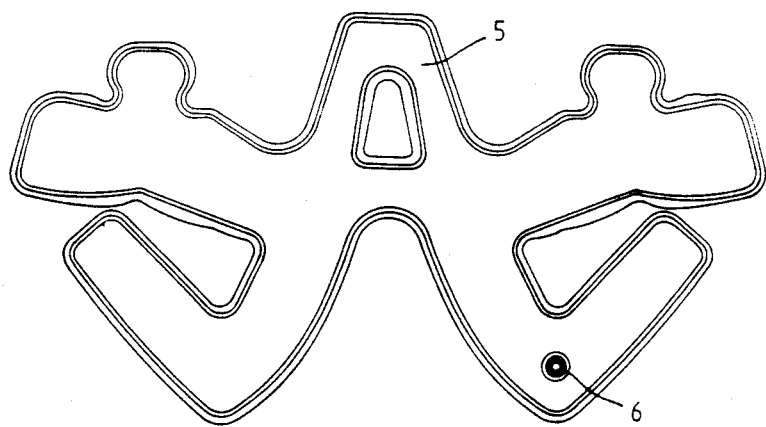
FIG. 2A is a plan view of the shock absorbing tube for the upper cloth used in combination with the safety cloth according to the present invention.
Figure 2B:
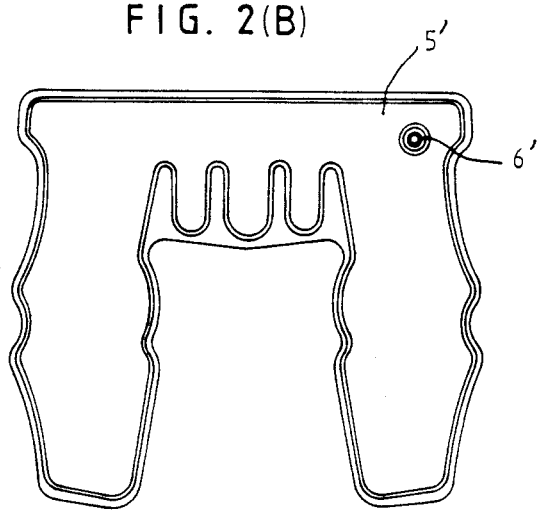
FIG. 2B is a plan view of the shock absorbing tube for the lower cloth used in combination with the safety cloth according to the present invention.

FIG. 2A and 2B illustrate a shock absorbing tube 5 which is installed between the inner and outer skins of the safety cloth to form a part of the safety cloth. FIG. 2A illustrates a shock absorbing tube for use in the upper cloth, and FIG. 2B illustrates a shock absorbing tube for the lower cloth. Each of said shock absorbing tubes 5,5' being provided with inlet connectors 6,6' for connecting the gas conduit.

Figure 3:
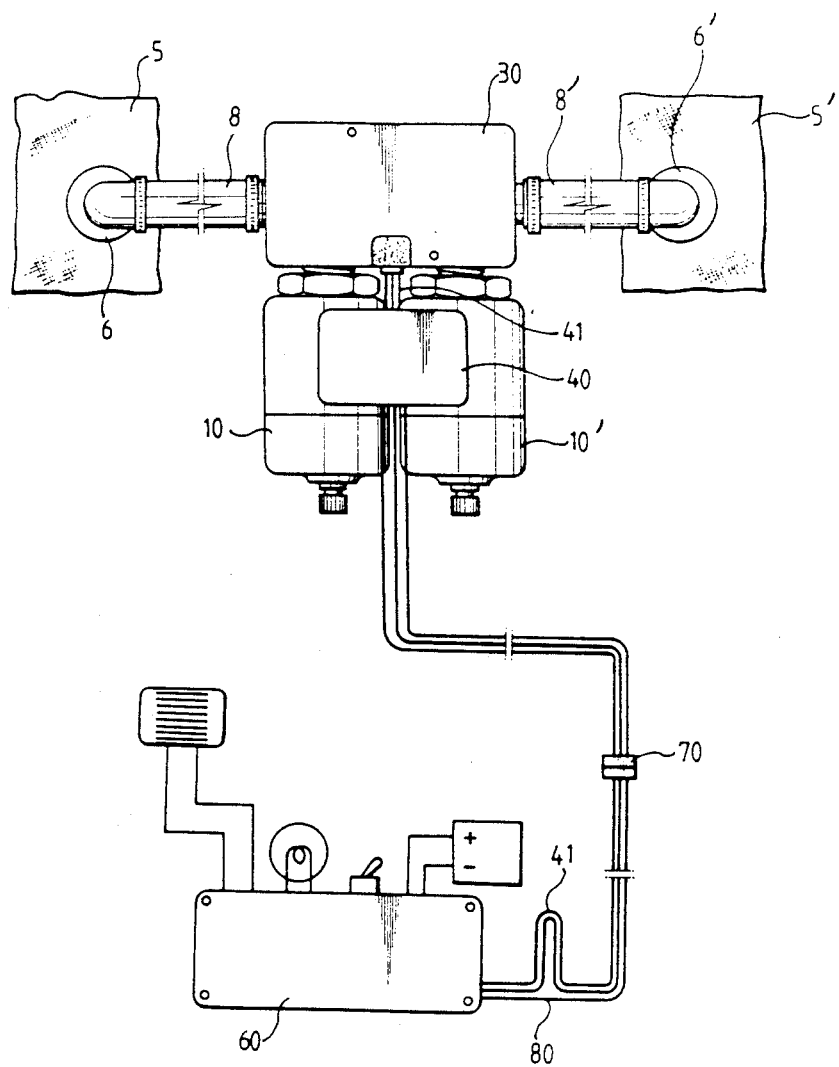
FIG. 3 illustrates the systematic arrangement of the compressed gas storage and discharge devices and the related components for the safety cloth according to the present invention.

FIG. 3 illustrates the systematical arrangement of the various components of the device of the present invention. The compressed gas storage and discharge devices 10,10' are connected through a gas regulator 30 and gas conduits 8,8' to the shock absorbing tubes 5,5'. Further, inlet connectors 6 is installed between the shock absorbing tubes, 5' and the gas conduits, 8' in such a manner that the two components 5,5' and 8,8' should be sealed and connected in an airtight state. The compressed gas storage and discharge devices 10,10', being governed by an ignition controller 40, will discharge the compressed gas. The ignition controller 40 is connected through a connector 70 to the trigger device 60. A pull string 80 is connected to the trigger device 60, and one of the ends of the pull string 80 is connected to one side of the connector 70. Thus, if the autocycle rider wearing the safety cloth departs from the autocycle by a certain predetermined distance, the trigger device 60 will generate a signal to activate the compressed gas storage and discharge devices 10' through the ignition controller 40, thereby making the compressed gas discharged.

Figure 4:
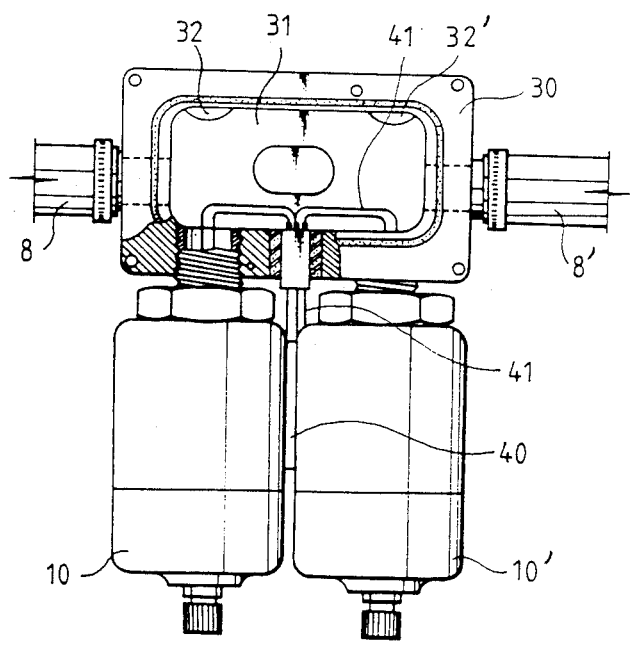
FIG. 4 illustrates the regulator according to the present invention in a rear view with its cover open to show its interior.

FIG. 4 illustrates the internal structure of the gas regulator 30 to which a pair of the compressed gas storage and discharge devices 10,10' are connected side by side. That is, the regulator 30 is provided with an inner cavity 31 through which the gas passes. On the inner surface of the cavity 31 opposite from the location of the compressed gas storage and discharge devices, there are provided a pair of gently elevated portions 32' for dispersing the gas after discharging from the compressed gas storage and discharge devices and before entering into the gas conduits 8,8'. Further, electric wires 41 which connect the ignition controller 40 and the compressed gas storage and discharge devices 10,10', pass through the interior of the cavity.

Figure 5:
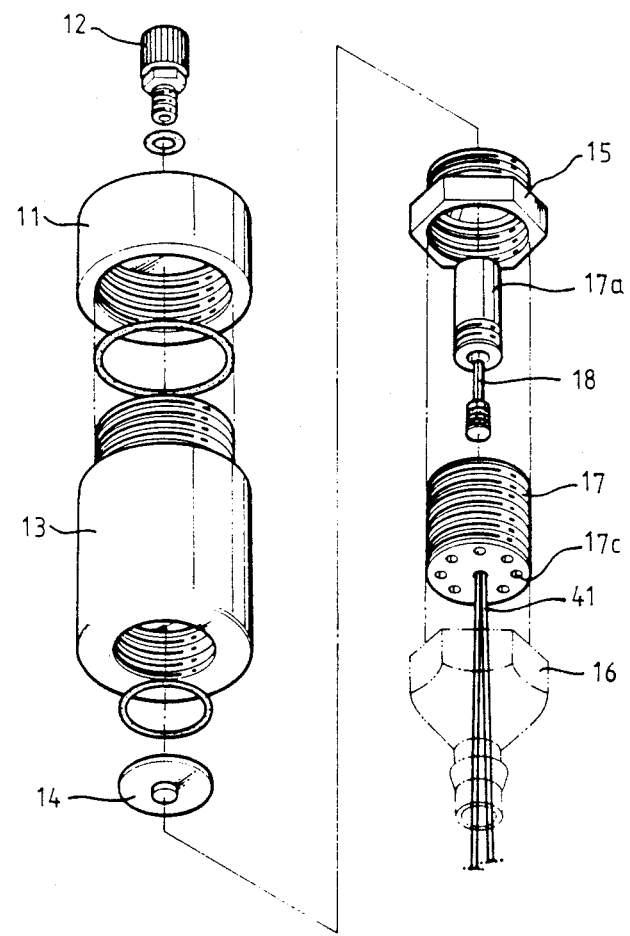
FIG. 5 is an exploded perspective view of the compressed gas storage and discharge device according to the present invention.

FIG. 5 illustrates the compressed gas storage and discharge devices 10 in an exploded perspective view. This device consists of a gas storage container for storing the gas and a discharge device for discharging the gas. One of the opposite tips of a gas storage housing 13 is connected threadably to a cap 11 in an airtight state, with a check valve 12 being installed on the cap 11. The other tip of the gas storage housing 13 is closed threadably with a closure disc 14 in an airtight state, and at the same time, is threadably connected to an inner housing 15. One of the tips of the inner housing 15 receives threadably an outer striker insertion cylinder 17 which is threadably coupled with an outer housing 16. The outer striker insertion cylinder 17 receives an inner striker insertion cylinder 17a, and the interior of the said cylinder 17a is filled with explosive. That is, the explosive is filled in an explosive loading cavity which is formed within the inner striker insertion cylinder. In contact with the loaded explosive, a striker 18 is inserted into the inner striker insertion cylinder, around the explosive loading cavity, with a plurality of gas passages 17c passing through in the vertical direction. Further, an electric wire 41 connected to the ignition controller 40 is inserted into said explosive loading cavity in such a manner that the inner tip of the wire 41 is connected to a filament 49. The cap 11 and the gas storage housing 13 are formed in separate units in consideration of the manufacturing convenience, but it will not be impossible to form them in an integral body.

The closure disc 14 may be desirably made from a ceramic material which can withstand against a high pressure, but should be destroyed upon receipt of an impact of a certain predetermined level.

Figure 6A:
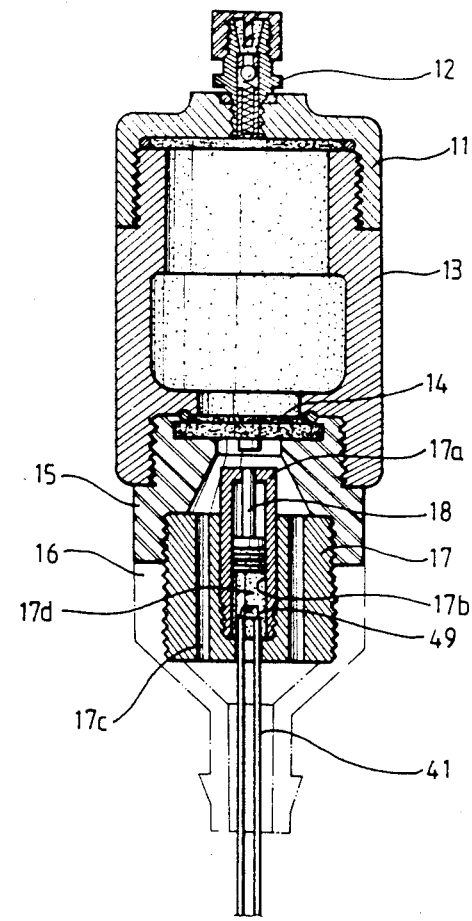
FIG. 6A is a sectional view showing the compressed gas storage and discharge device in a state with the compressed gas stored.

An assembled gas storage and discharge device 10 is illustrated in FIG. 6A. If the trigger device 60 is activated to supply an electric current through the ignition controller 40 to the filament 49, the explosive is detonated to push out the striker 18 and to destroy the closure disc 14. As shown in FIG. 6B, the compressed gas stored in the gas storage housing 13 is discharged through the inner housing 15, the gas passages 17c and the outer housing 16.

Figure 7:
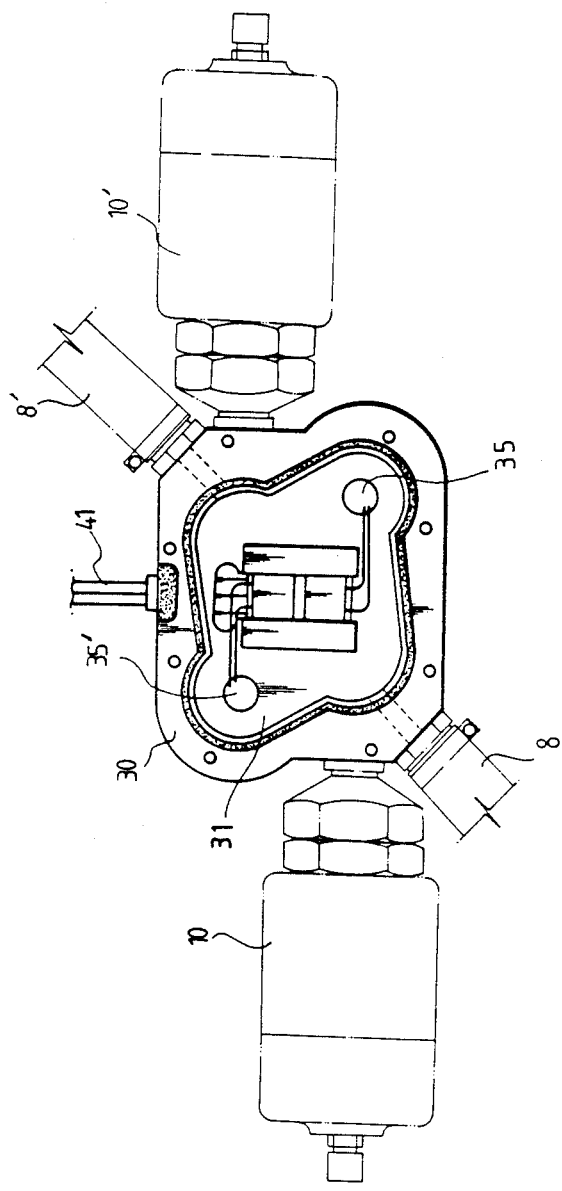
FIG. 7 is a rear view of another embodiment of the gas regulator with its cover open.
Figure 8:
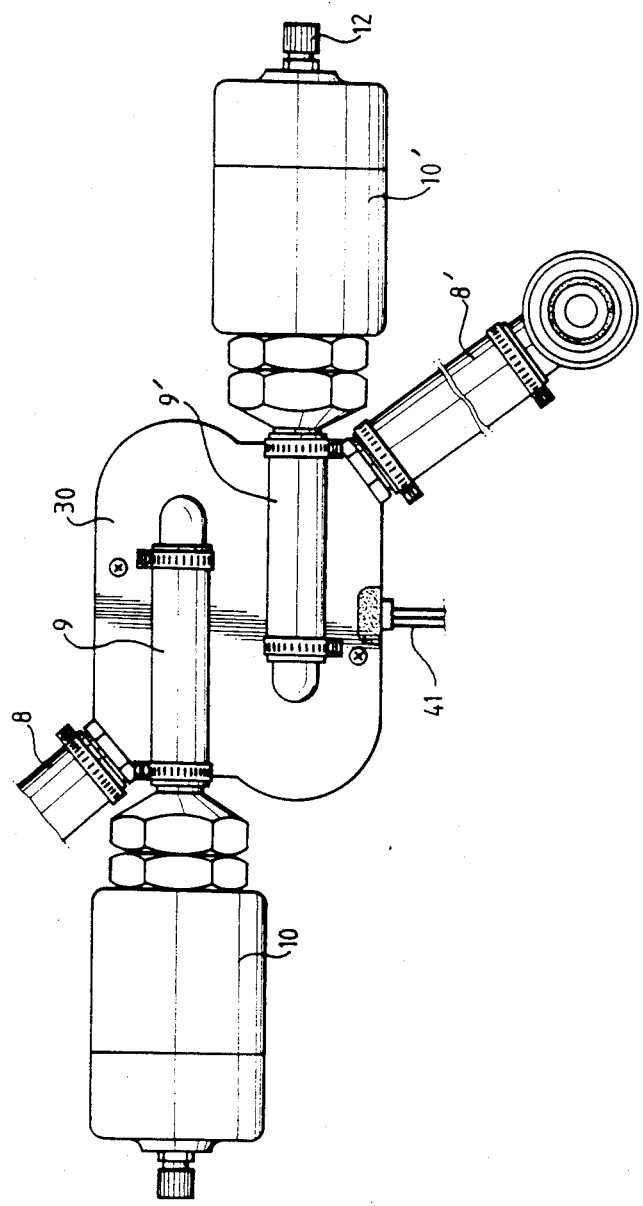
FIG. 8 is a frontal view of the gas regulator of FIG. 7.

FIGS. 7 and 8 illustrate another embodiment of the gas regulator 30. As can be clearly seen in FIG. 7 in which the cover (not shown) is removed, this gas regulator 30 is provided with an inner cavity 31 in such a manner that the compressed gas could flow through the cavity 31. As can be seen in FIG. 8, a pair of the compressed gas storage and discharge devices 10,10' are arranged in such a manner that they are open through the connection conduits, 9' to the gas inlets 35,35'.

The gas conduits 8,8' which are connected to the shock absorbing tube are disposed in such a manner that they should be open to the cavity 31. Further, the said inlets 35,35' are disposed far away from the gas conduits 8,8' in the diagonal direction so that when the compressed gas introduced from the gas inlets 35' flows through the cavity 31 into the gas conduits 8,8' the flow of the gas should be dispersed within the cavity 31.

Here, it should be noted that the outer housing 16 is not needed in the gas regulator of FIGS. 3 and 4, but is needed in the gas regulator of FIGS. 7 and 8. The reason is that in the case of the former, the outer end of the outer striker insertion cylinder 17 is directly threadably connected to the gas regulator. Therefore, in the case of the former, the structure becomes simpler, and the occupation volume also is very much reduced. Accordingly, the assembly of the gas regulator 30, the compressed gas storage and discharge device 10 and the ignition controller 40 can be packed into a bag 2 of a small volume as shown in FIG. 1.

The compressed gas storage and discharge device 10 according to the present invention is formed by threadably assembling different components, and therefore, after discharge of the gas, or in the case of damages of a part of the device, the replacement is extremely easy. Especially, after discharge of the gas, the restoring tasks such as replacement of the closure disc 14, replacement of the outer striker insertion cylinder 17 and filling of the compressed gas through the check valve into the gas storage housing 13 have only to be carried out, and therefore, the re-use of this device is very convenient and economical.

Figure 9A:
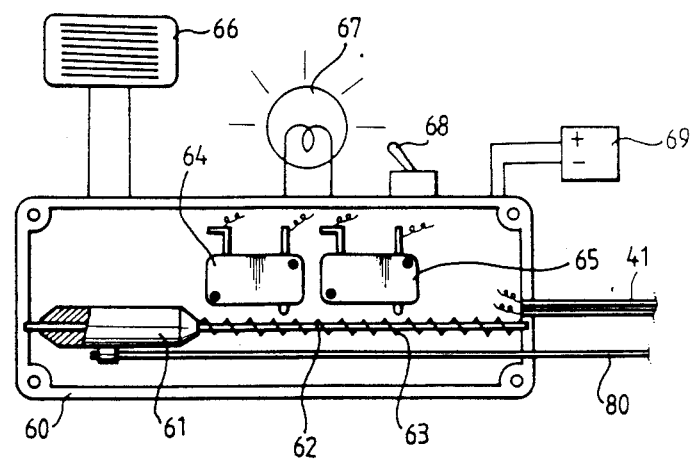
FIG. 9A is a plan view of the trigger device with its cover open and with its sliding cam at the normal position.
Figure 9B:
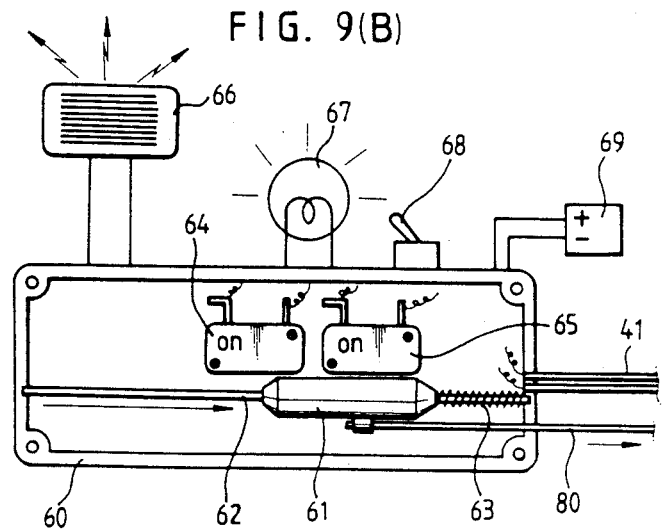
FIG. 9B is a plan view of the trigger device with its cover open and its sliding cam pulled by a pull string to turn on the warning switch and the discharge switch.

FIG. 9A illustrates the trigger device 60 which has the function of triggering the discharge of the compressed gas by sending a signal to the ignition controller 40, the device 60 being illustrated in a state with the cover (not shown) removed. Here, a sliding cam 61 is elastically installed by means of a spring 63 in such a manner that the sliding cam 61 should be slidable along a support rod 62 upon pulling of the pull string 80. Further, a warning switch 64 and a discharge switch 65 are successively disposed next the sliding cam 61. If the pull string 80 is pulled, said warning switch and the said discharge switch are successively turned on by the sliding cam 61 as shown in FIG. 9B. If the pull string 80 is pulled by only a certain distance, then only the warning switch 64 can be turned on to activate a buzzer 66, so that the wearer of the safety cloth should refrain from further movement.

In the case of an accident, if the wearer of the safety cloth departs from the autocycle by over a certain predetermined distance to such extent that the pulling of the pull string 80 exceeds a certain range, the discharge switch is also turned on to send a signal to the ignition controller 40.

Reference numeral 63 indicates a spring, 67 indicates a circuit break indicating lamp, 68 indicates a power source switch, and 69 indicates a battery.

Figure 10:
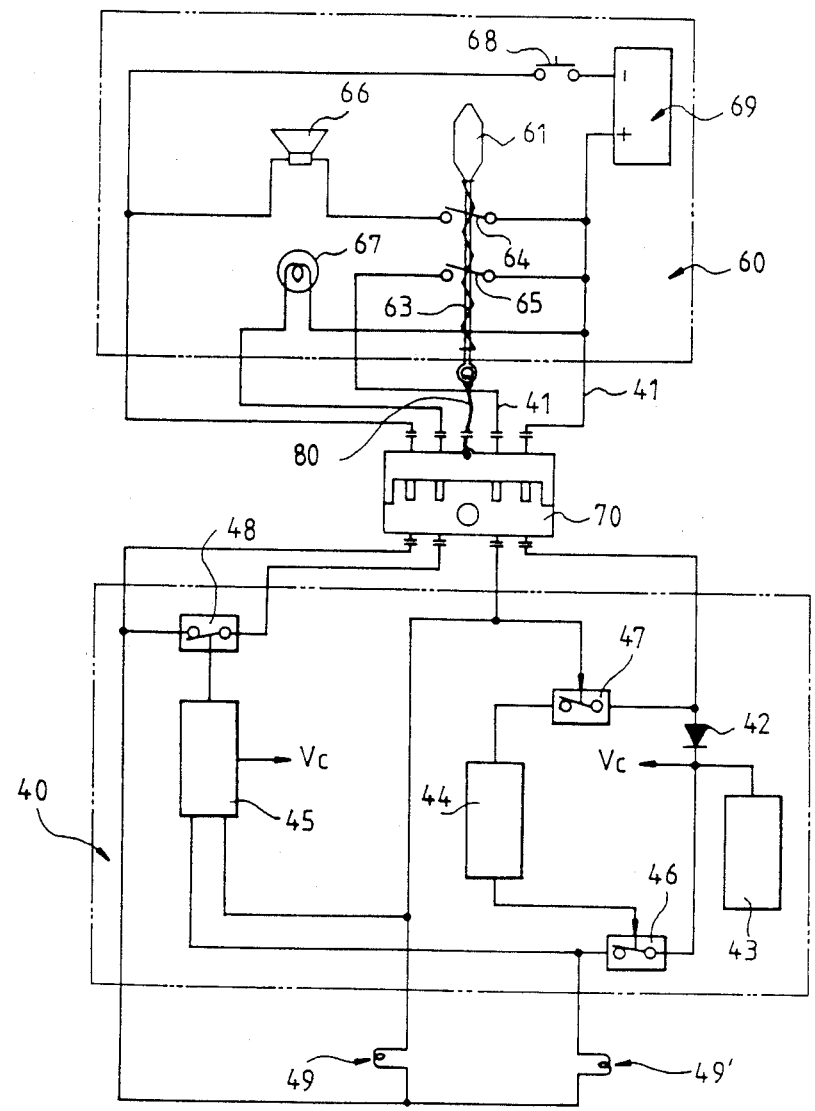
FIG. 10 is a block diagram illustrating the constitution of the circuit of the device according to the present invention.

Now the ignition controller will be described referring to FIG. 10, which operation is governed by the signals from the trigger device. The power supply to the ignition controller 40 is made from the battery 69 through the trigger device 60.

The ignition controller 40, upon receipt of a switching signal from the discharge switch 65, will activate the circuit break indicating lamp 67 of the trigger device 60 by detecting the existence or absence of any circuit break in the filament of the said compressed gas storage and discharge device 10. Further, the ignition controller 40 comprises: an electric charger 43 for charging the supplied electric power through a reverse flow prevention diode 42; a delay circuit 44 for supplying the electric power to the second filaments 49, 49' of the compressed gas storage and discharge devices 10, 10' after having delayed the charged electric power for a predetermined period of time in response to the signal from the discharge switch 65 of the trigger device 60; and a circuit break detection circuit 45 for activating the circuit break indicating lamp 67 of the trigger device 60 by detecting the existence or absence of a break in the first and second filaments 49, 49'.

Reference numerals 46, 47 and 48 indicate electronic switching circuits.

The electric power is supplied through the discharge switch 65 of the trigger device 60 to said first filament 49.

Figure 11:
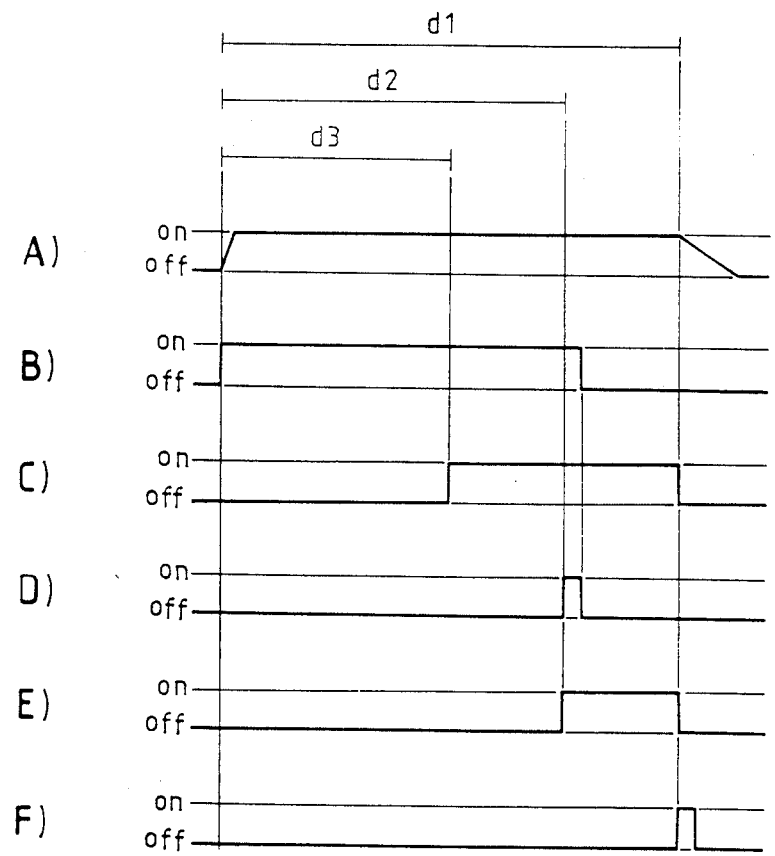
FIG. 11A shows a voltage wave pattern of the electric charger.
FIG. 11B shows an ON/OFF wave pattern of the circuit break indicating lamp.
FIG. 11C shows an ON/OFF wave pattern of the warning switch.
FIG. 11D shows a wave pattern of the primary explosion effected upon turning-on of the discharge switch.
FIG. 11E shows a wave pattern of delay circuit effected upon turning-on of the discharge switch.
FIG. 11F shows a wave pattern of the secondary explosion effected upon turning-on of electronic switching circuit.

The ignition controller 40 as constituted above will be described further as to its functions by referring to FIG. 11. If the power source switch 68 is turned on in a state with the connector 70 of FIG. 10 connected, then the power is supplied from the battery 69 to the ignition controller 40, the charger 43 is charged as indicated in FIG. 11A, and the circuit break detection circuit 45 will turn on the electronic switching circuit 48 in the case where the first and second filaments 49, 49' are not broken, so that the circuit break indicating lamp 67 of the trigger device 60 should be lighted as shown in FIG. 11B, thereby making it possible for the wearer of the safety cloth to confirm the existence or absence of a circuit break. Further, the charger 43 can be charged as indicated in FIG. 11A.

If the pull string 80 is pulled up to the distance d3, the warning switch 64 is turned on as shown in FIG. 11C to activate the buzzer 64a and to generate a warning sound. Upon occurrence of an accident (colliding accident), if the wearer of the safety cloth departs from the autocycle, and if the string is pulled up to the distance d2, then the discharge switch 65 is turned on, and at the same time, the electric power from the battery 69 is supplied to the first filament 49 to effect the primary explosion as indicated in FIG. 11D. Further, due to the switching on of the discharge switch 65, the electronic switching circuit 47 will be turned on, and therefore, the electric power will be supplied to the delay circuit 44. The delay circuit 44 will count up to a predetermined period time, for example, 20–40 milliseconds as in FIG. 11E, and upon completion of this counting, the delay circuit 44 will close the electronic switching circuit 46, so that the electric power charged into the charger 43 should be supplied through the electronic switching circuit 46 to the second filament 49', thereby effecting the secondary explosion as indicated in FIG. 11F.

The secondary explosion is effected immediately upon separation of the connector 70 due to the pulling of the pull string 80 up to the distance d1, and therefore, the explosion is carried out by the electric power released from the charger in a state with the power source being disconnected.

FIG. 12A illustrates the connector 70 disposed between the electric wires which connect the trigger device 60 and the ignition controller 40. The connector 70 consists of male and female pieces 71, 72. These two pieces are constituted such that one of them has a magnet 73, and the other one has a piece 74 of magnetic material. Therefore, when the said two pieces are made to mate each other, the magnet 73 and the piece 74 will adhere to each other so that they can not be separated from each other, unless a certain pulling force is applied.

When the wearer of the safety cloth rides an autocycle, the said connector pieces 71, and 72 should be joined together. If the rider is to get off the autocycle, said connector pieces should be detached from each other.

However, if an accident occurs during the riding of an autocycle accompanied by the filling of the compressed gas into the shook absorbing tube and by the separation of the wearer of the safety cloth from the autocycle by a considerable distance, then the male and female connector pieces are separated, leaving only the trigger device on the autocycle. The gas storage and discharge device, the ignition controller, the gas regulator and the like are carried together with the wearer of the safety cloth, in a state packed into a small bag.

Further, a means for electrically connecting/separating the wires 41 is provided in said male and female 71 and 72 pieces of the connector. In the illustrated embodiment, the pull string 80 together with the wires 41, 41' are connected to the connector 70 to be ultimately connected to the safety cloth. But, depending on the requirements, a separate detachable connector can be provided to connect the pull string between the trigger device and the safety cloth.

Normally, the safety cloth according to the present invention is made to consist of upper and lower clothes, but, depending on the circumstance, it may be made to consist of only an upper or lower cloth.

The safety cloth according to the present invention can be used not only on autocycles but also for other purposes. Further, it can be used not only for men, but also in order to protect inanimate objects which are weak against impacts. Further, the device of the present invention can play the role of a float, because the shock absorbing tube is expanded by the compressed gas.

Further, the various components for storing and filling the compressed gas in the device of the present invention can be utilized in shock absorbing devices for automobiles.

What is claimed is:

1. A gas expansion type shock absorbing safety cloth for autocycle drivers, comprising:
   shock absorbing means capable of instantly expanding through the filling of stored compression gas upon departing of the wearer of the safety cloth from the autocycle by over a predetermined distance;
   a gas regulator connected through gas conduits to said shock absorbing means;
   one or more compressed gas storage and discharge devices connected to said gas regulator in such a manner that they can momentarily discharge the stored compressed gas to said gas regulator in response to the signal emitted by an ignition controller;
   a trigger device affixed to said autocycle connected through an electric wire and a pull string to said ignition controller in such a manner that, upon detection of a certain predetermined separation distance of the wearer of the safety cloth from the autocycle, a warning sound is generated or the compressed gas is discharged;
   a connector separable into two halves disposed at an intermediate position of both the electric wire and the pull string in such a manner that it is separated upon applying of a pulling force exceeding a certain predetermined value;
   and said shock absorbing means, gas regulator, compressed gas storage and discharge devices and ignition controller being integrated as a unit in said safety cloth;
   whereby upon the application of a pulling force exceeding a certain predetermined value, said connector separates into two halves and said safety cloth with the above said articles integrated as a unit therein is disconnected altogether from the autocycle, said safety cloth being reusable by reuniting said connector and restoring said compressed gas storage and discharge devices.

2. The gas expansion type shock absorbing safety cloth as claimed in claim 1, wherein said compressed gas storage and discharge device includes a combination of a compressed gas storing container and a compressed gas discharging unit.

3. The gas expansion type shock absorbing safety cloth as claimed in claim 2, wherein said compressed gas discharging unit comprises: a gas storage housing; a closure disc sealingly attached to one of the tips of said gas storage housing; an inner housing threadably connected to the same tip of said gas storage housing; an outer striker insertion cylinder having external threads and threadably connected to the other tip of said inner housing; an inner striker insertion cylinder received into said outer striker insertion cylinder and having an explosive loading space in the interior thereof; a striker installed beside the explosive loading space; a filament disposed within said explosive loading space and connected to an electric wire which is in turn connected to said ignition controller; and a plurality of gas passages formed around the explosive loading space in the vertical direction.

4. The gas expansion type shock absorbing safety cloth as claimed in claim 3, wherein said closure disc is made of ceramic material which can withstand against a high pressure but can be destroyed without fail upon applying of an impact of a certain predetermined level.

5. The gas expansion type shock absorbing safety cloth as claimed in claim 2, wherein said compressed gas storing container is constituted such that a cap having a check valve is threadably connected to one of the opposite tips thereof, and a closure disc is put to the other tip thereof in an air-tight state.

6. The gas expansion type shock absorbing safety cloth as claimed in claim 1, wherein said gas regulator is provided with an inner cavity through which the compressed gas is made to flow; two or more of said compressed gas storage and discharge devices are attached side by side to one of the side walls of said gas regulator; two or more of gently elevated portions are formed on the inner wall surface of said cavity opposite from the locations of said compressed gas storage and discharge devices in order to disperse the compressed gas flowing through the cavity; ad gas conduits are respectively connected to the opposite end walls of the gas regulator, the other ends of the gas conduits being connected to the shock absorbing tube.

7. The gas expansion type shock absorbing safety cloth as claimed in claim 1, wherein said gas regulator is provided with an inner cavity through which the compressed gas is made to flow; one or more of said gas conduits are connected to said gas regulator; and two compressed gas storage and discharge devices are attached to the gas regulator opposingly facing each other through gas inlets which are disposed in a diagonal direction relative to the connecting direction of said gas conduits.

8. The gas expansion type shock absorbing safety cloth as claimed in claims 6 or 7, wherein an electric wire connected between said ignition controller and said compressed gas storage and discharge device passes through the cavity of the gas regulator in such a manner that the sealed state of the cavity can be maintained.

9. The gas expansion type shock absorbing safety cloth as claimed in claim 1, wherein whenever there are two or more of said compressed gas storage and discharge devices, the gases are discharged successively with a certain time gap in response to the signals from the trigger device.

10. The gas expansion type shock absorbing safety cloth as claimed in claim 1, wherein said trigger device is provided with a sliding cam which is elastically installed by means of a spring in such a manner that the cam is slidable long a support rod upon pulling of the pull string; a warning switch and a discharge switch are installed in a parallel direction relative to said support rod in such a manner that said warning switch and said discharge switch are successively activated by the sliding cam; and a buzzer is provided which is activated in correspondence with the activation of the warning switch.

11. The gas expansion type shock absorbing safety cloth as claimed in claim 1, wherein said trigger device is provided with circuit break detecting lamp which is activated by said ignition controller, and said ignition controller is provided with a circuit break detecting circuit for detecting the existence or absence of the breaking of filaments of the compressed gas storage and discharge devices.

12. The gas expansion type shock absorbing safety cloth as claimed in claim 1, wherein one of said compressed gas storage and discharge devices is activated by supplying a first ignition signal from said trigger device to said ignition controller, and the other one of said compressed gas storage and discharge devices is activated by supplying a second ignition signal which is emitted after being delayed for a predetermined period of time from the time when the first ignition signal is generated.

13. The gas expansion type shock absorbing safety cloth as claimed in claim 1, wherein said ignition controller comprises: an electric charge for charging the electric current supplied from said trigger device and a delay circuit for supplying the electric current charged into said electric charger to a second filament of said compressed gas storage and discharge device after having delayed for a predetermined period of time in response to the switching signal from said discharge switch; said compressed gas storage and discharge device being activated upon turning-on of said discharge switch, and again activated after being delayed for a predetermined period of time.

14. The gas expansion type shock absorbing safety cloth as claimed in claim 1, wherein said connector includes male and female pieces for interconnecting the electric wire and the pull string extended from the trigger device and the electric wire and the pull string extended from the ignition controller; one of said male and female pieces has a magnetic material piece, for the coupling of said two pieces, which cannot be separated unless a pulling force of a predetermined level is applied.

15. The gas expansion type shock absorbing safety cloth as claimed in claim 1, wherein said compressed gas storage and discharge device, said gas regulator, and said ignition controller are packed into a bag for carrying by the driver.

* * * * *